US012572033B2

(12) United States Patent
Sullivan

(10) Patent No.: US 12,572,033 B2
(45) Date of Patent: Mar. 10, 2026

(54) OPTICAL LENS HAVING OFF-CENTER MAGNIFICATION GRADIANT

(71) Applicant: Path Makar, LLC, Henderson, NV (US)

(72) Inventor: Sean Sullivan, Henderson, NV (US)

(73) Assignee: Way Makar, LLC, Henderson, NV (US)

( * ) Notice: Subject to any disclaimer, the term of this patent is extended or adjusted under 35 U.S.C. 154(b) by 0 days.

(21) Appl. No.: 18/740,915

(22) Filed: Jun. 12, 2024

(65) Prior Publication Data

US 2024/0329430 A1 Oct. 3, 2024

Related U.S. Application Data

(63) Continuation of application No. 18/165,140, filed on Feb. 6, 2023, now abandoned.

(51) Int. Cl.
*G02C 7/06* (2006.01)

(52) U.S. Cl.
CPC ......... *G02C 7/066* (2013.01); *G02C 2202/04* (2013.01)

(58) Field of Classification Search
CPC ............................... G02C 7/041; G02C 7/061
USPC ........................................ 351/159.41, 159.42
See application file for complete search history.

(56) References Cited

U.S. PATENT DOCUMENTS

| | | | |
|---|---|---|---|
| X9422 I1 | 2/1836 | Schnaitman | |
| 798,435 A | 8/1905 | Mayer | |
| 1,321,440 A | 11/1919 | Hill | |
| 1,413,945 A | 4/1922 | Stead | |
| 3,010,366 A | 11/1961 | Crawford | |
| 4,461,550 A | 7/1984 | Legendre | |
| 6,000,798 A | 12/1999 | Chipman | |
| 8,002,404 B2 | 8/2011 | Weatherby | |
| 8,029,134 B2 | 10/2011 | Blum | |
| 8,157,376 B2 * | 4/2012 | Drobe | G02C 7/027 351/159.74 |
| 9,022,563 B2 | 5/2015 | Gupta | |
| 9,223,148 B2 * | 12/2015 | Fiala | G02C 7/041 |

(Continued)

OTHER PUBLICATIONS

Patent Cooperation Treaty, International Search Report and Written Opinion for International Application No. PCT/US 24/14311, May 22, 2024, 10 pages.

(Continued)

*Primary Examiner* — Zachary W Wilkes
(74) *Attorney, Agent, or Firm* — Stetina Garred Brucker & Newboles

(57) ABSTRACT

An optical lens for use with an eyewear frame includes an inner surface and an outer surface, with the lens being configured to be positionable adjacent a wearer's eye to enable viewing through both the inner and outer surfaces of the lens. The optical lens additionally includes a plurality of magnification regions, with each magnification region extending between the inner surface and the outer surface and being associated with a respective minimum magnification magnitude and a respective peripheral boundary. The peripheral boundaries for the plurality of magnification regions are disposed about a common center of magnification. The lens includes a geometric center residing on at least one of a longitudinal midline of the lens or a latitudinal midline of the lens, with the center of magnification being offset from the geometric center.

20 Claims, 5 Drawing Sheets

(56) References Cited

U.S. PATENT DOCUMENTS

| 10,175,506 | B2 | | 1/2019 | Lin | |
| 10,712,590 | B2 | * | 7/2020 | Rousseau | G02C 7/066 |
| 11,614,640 | B2 | | 3/2023 | Mappes | |
| 11,740,488 | B2 | | 8/2023 | Kelch | |
| 11,892,712 | B2 | | 2/2024 | Kelch | |
| 12,130,504 | B2 | * | 10/2024 | Qi | G02C 7/02 |
| 2010/0085535 | A1 | * | 4/2010 | Drobe | G02C 7/027 |
| | | | | | 351/159.41 |
| 2010/0201941 | A1 | | 8/2010 | Gupta | |
| 2010/0283963 | A1 | | 11/2010 | Giraudet | |
| 2013/0050640 | A1 | * | 2/2013 | Fiala | G02C 7/041 |
| | | | | | 351/159.43 |
| 2016/0313572 | A1 | | 10/2016 | Haddock et al. | |
| 2017/0212364 | A1 | | 7/2017 | Lin | |
| 2018/0314078 | A1 | * | 11/2018 | Rousseau | G02C 7/065 |
| 2019/0250430 | A1 | | 8/2019 | Mappes | |
| 2021/0199991 | A1 | | 7/2021 | Kelch | |
| 2022/0091437 | A1 | | 3/2022 | Kelch | |
| 2022/0206320 | A1 | * | 6/2022 | Qi | G02C 7/063 |
| 2022/0291520 | A1 | | 9/2022 | Lippey et al. | |

OTHER PUBLICATIONS

Meister, Darryl, and James E. Sheedy; "Introduction to Ophthalmic Optics;" Carl Zeiss Vision; 2008; 130 pages.

* cited by examiner

OPTICAL LENS HAVING OFF-CENTER MAGNIFICATION GRADIANT

CROSS-REFERENCE TO RELATED APPLICATIONS

This application is a continuation of U.S. application Ser. No. 18/165,140 filed Feb. 6, 2023, the entire contents of which is expressly incorporated by reference.

STATEMENT RE: FEDERALLY SPONSORED RESEARCH/DEVELOPMENT

Not Applicable

BACKGROUND

1. Technical Field

The present disclosure relates generally to eyewear lenses, and more specifically, to eyewear lenses having multiple magnification regions, wherein lower magnification regions are located radially outward relative to higher magnification regions and the magnification regions are centered about a location offset from a geometric center of the lens.

2. Description of the Related Art

Presbyopia may refer to the gradual loss of an eye's ability to focus on close or nearby objects. This may become noticeable in a person's forties and may continue to worsen through a person's sixties. As such, the use of reading glasses is very common as people begin to experience presbyopia. Conventional reading glasses may include vision-corrective capabilities, with the magnitude of that corrective power typically being rated in diopters, e.g., a lens having an optical power of 2.0 diopters is stronger than a lens having an optical power of 1.5 diopters.

Although conventional reading glasses provide some measure of correcting a user's vision, conventional reading glasses may suffer from one or more deficiencies. For instance, the lenses used in the glasses may have a uniform thickness, which may result in a lens having a single optical power throughout the lens. While the single optical power may provide clear vision enhancing capabilities in a certain area, other areas of the lens may produce distorted vision, particularly around the peripheral regions of the lens.

Accordingly, there is a need in the art for an enhanced lens that may Various aspects of the present disclosure address this particular need, as will be discussed in more detail below.

BRIEF SUMMARY

In accordance with one embodiment of the present disclosure, there is provided an optical lens for use with an eyewear frame. The optical lens includes an inner surface and an outer surface, with the lens being configured to be positionable adjacent a wearer's eye to enable viewing through both the inner and outer surfaces of the lens. The optical lens additionally includes a plurality of magnification regions, with each magnification region extending between the inner surface and the outer surface and being associated with a respective minimum magnification magnitude and a respective peripheral boundary. The peripheral boundaries for the plurality of magnification regions are disposed about a common center of magnification. The lens includes a geometric center residing on at least one of a longitudinal midline of the lens or a latitudinal midline of the lens, with the center of magnification being offset from the geometric center.

The longitudinal midline may delineate an upper region of the lens from a lower region of the lens, with the center of magnification being positioned within the lower region of the lens. The latitudinal midline may delineate a lateral region of the lens from a medial region of the lens, with the center of magnification being positioned within the medial region of the lens. The inner surface and the outer surface may define lens thickness therebetween, with the lens thickness varying along the longitudinal midline.

The latitudinal midline may delineate a lateral region of the lens from a medial region of the lens, with the center of magnification being positioned within the medial region of the lens. The inner surface and the outer surface may define a lens thickness therebetween, with the lens thickness varying along the latitudinal midline.

The minimum magnitude of magnification of one of the plurality of magnification regions may be 0.0 diopters and the minimum magnitude of magnification of a second one of the plurality of magnification regions may be 2.65 diopters.

A difference in magnitude of magnification of adjacent magnifications regions may be 0.15 diopters.

The boundaries associated with at least two of the plurality of magnification regions may define an enclosed loop.

According to yet another embodiment, there is provided eyewear for use on a wearer and positionable adjacent eyes of the wearer. The eyewear includes an eyewear frame having a pair of lens rims defining a pair of lens openings. A pair of optical lenses are attachable to respective ones of the pair of lens rims to reside within respective ones of the pair of lens openings. Each optical lens includes an inner surface and an outer surface, with the lens being configured to be positionable adjacent a wearer's eye to enable viewing through both the inner and outer surfaces of the lens. Each optical lens additionally includes a plurality of magnification regions, with each magnification region extending between the inner surface and the outer surface and being associated with a respective minimum magnification magnitude and a respective peripheral boundary. The peripheral boundaries for the plurality of magnification regions are disposed about a common center of magnification. The lens includes a geometric center residing on at least one of a longitudinal midline of the lens or a latitudinal midline of the lens, with the center of magnification being offset from the geometric center.

The pair of optical lenses may include a left-side lens and a right side lens, with the right side lens being a mirror image of the left side lens about an axis centered between the pair of lens rims.

According to yet another embodiment, there is provided a single, unitary lens configured to be incorporated into eyewear positionable adjacent eyes of the wearer. The single, unitary lens includes a pair of optical regions integrally coupled to each other, with each optical region being optically alignable with a respective one of the eyes of the wearer during use. The single, unitary lens additionally includes an inner surface and an outer surface, with both the inner and outer surfaces extending across the pair of optical regions. The lens is configured to be positionable adjacent a wearer's eyes to enable viewing through both the inner and outer surfaces of the lens. Each optical region includes a plurality of magnification regions, with each magnification region extending between the inner surface and the outer surface and being associated with a respective minimum magnification magnitude and a respective peripheral boundary. The peripheral boundaries for the plurality of magnification regions are disposed about a common center of magnification. Each optical region defines a respective geometric center residing on at least one of a longitudinal midline of the optical region or a latitudinal midline of the optical region, with the center of magnification being offset from the geometric center.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of an eyewear lens having multiple, distinct, de-centered regions of magnification and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure pertain to an eyewear lens having multiple magnification regions that vary in magnification magnitude. The magnification regions may be positioned about an inner region that is of highest magnitude, with the remaining magnification regions decreasing incrementally in a radially outward direction relative to the inner region. The center of the inner region may be offset from a geometric center of the lens (i.e., de-centered), which may be more compatible with the configuration and operation of the human eye. The offset location of magnification regions may provide for sharp vision with reduced distortion, while mitigating strain on the wearer's eye.

Figure 1:
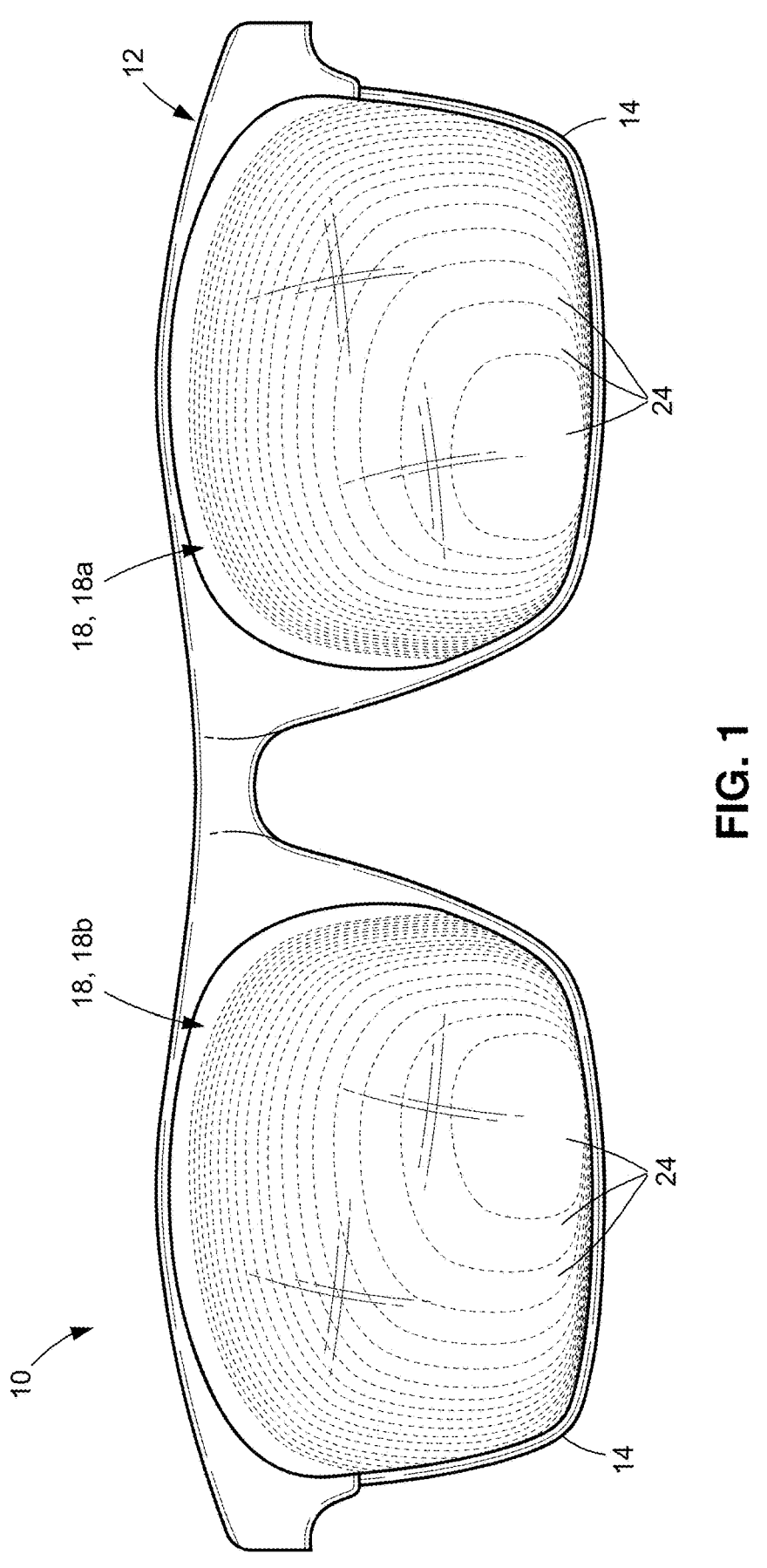
FIG. 1 is a front view of eyewear having distinctive left and right lenses, each of which include a plurality of magnification regions centered at a location offset from a geometric center of the lens.

Referring now specifically to FIG. 1, there is depicted eyewear (e.g., glasses) 10 having a frame 12 includes lens rims 14 and temple arms (not shown) that may be pivotally coupled to the lens rims 14 and adapted to extend over a user's ears to facilitate retention of the eyewear 10 on the wearer. The lens rims 14 may define respective lens openings and may be connected via a nose bridge 16, which may rest on the wearer's nose during use. A pair of nose pads (not shown) may be connected/integrated into the nose bridge 16 or the lens rims 14 to enhance the comfort of the frame 12 resting on the wearer's nose. The frame 12 may be available in a variety of colors, shapes, sizes, and configurations to accommodate wearers of different age, size, as well as different aesthetic preferences.

The eyewear 10 additionally includes a pair of optical lenses 18, with each eyewear lens 18 being configured to engage with a respective lens rim 14 and extend within one of the lens openings of the frame 12. In this regard, one lens 18a is specifically configured to extend within the left-side opening (relative to a user's field of view, i.e., the user's left side, which is viewed on the right side of FIG. 1) and another lens 18b is specifically configured to extend within the right-side opening (relative to the user's field of view, i.e., the user's right side, which is viewed on the left side of FIG. 1). The unique configurations of the left and right lenses 18a, 18b not only relate to the physical periphery of the lenses 18a, 18b, but also in the location of a vision enhancing gradient within the lenses 18a, 18b, as will be explained in more detail below. Reference numeral 18 will be used to refer to the lens(es) 18 generally, while reference numeral 18a will be used when referring specifically to the left lens and reference numeral 18b will be used when referring specifically to the right lens.

Each lens 18 includes an inner surface 20 (see FIGS. 4 and 5) and an outer surface 22, with the inner surface 20 being configured to face the user's eye during use, and the outer surface 22 being configured to face away from the user's eye during use. In many embodiments, the inner surface 20 may be of a slightly concave configuration, while the outer surface 22 may be of a slightly convex configuration. The lenses 18 are configured to provide vision enhancement, e.g., magnification, to a user when the user looks through the lenses 18 such that the line of sight passes through the inner surface 20 and the outer surface 22.

Figure 2:
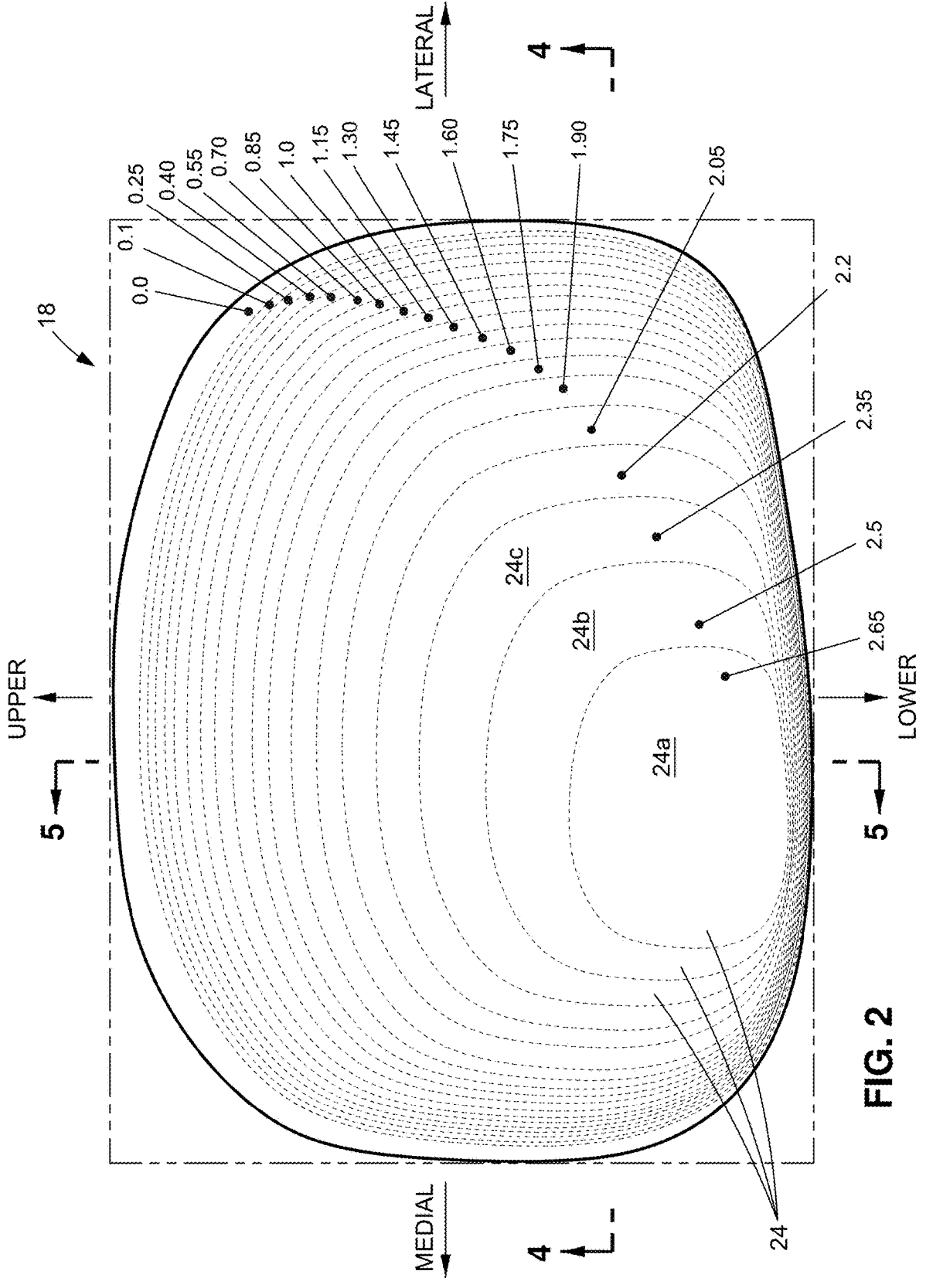
FIG. 2 is an enlarged front view of a lens including the plurality of magnification regions with corresponding diopter ratings being identified.

Each lens 18 includes a plurality of magnification regions 24, e.g., vision enhancement regions, throughout the lens 18 and extending between the inner surface 20 and the outer surface 24. FIG. 1 shows an exemplary magnification gradient or layout of the different magnification regions 24 within each lens 18. Each magnification region 24 is bound by at least one phantom line that represents an outer boundary of each magnification region 24. FIG. 2 shows the diopter rating for each magnification region 24. As can be seen, in the exemplary embodiment, the highest diopter rating is 2.65, while the lowest diopter rating is 0.0. The diopter ratings decrease from 2.65 by 0.15 increments, until the last transition from a diopter rating of 0.1 to 0.0, which results in nineteen different magnification regions 24 located within the lens.

The diopter rating within a given magnification region 24 may refer to the minimum diopter rating within the region 24. In other words, the entire area located within a given boundary is associated with a diopter rating that is at least equal to the identified diopter rating. Thus, for the 2.65 diopter region 24a (see FIG. 2), the entirety of that area is associated with a diopter strength of 2.65 of greater; for the 2.5 diopter region 24b+24a, the entirety of that area is associated with a diopter strength of 2.5 or greater (which includes the 2.65 region 24a); for the 2.35 diopter region 24c+24b+24a the entirety of that area is associated with a diopter strength of 2.35 or greater (which includes the 2.5 region 24b and the 2.65 region 24a), and so forth.

The highest diopter rating (e.g., 2.65) may be associated with the smallest boundary, and the next highest diopter (e.g., 2.50) may be associated with the second smallest boundary, and so on. Many, if not all, boundaries may define an enclosed loop, meaning, there may not be a terminal end to the boundary. One or more outermost boundaries may not form an enclosed loop, as the extension of such a boundary may continue beyond the outer periphery of the lens 18. In one embodiment, the boundaries mimic the general peripheral contours of the lens 18. In the particular lens 18 depicted in FIG. 2, the lens 18 includes longer upper and lower peripheral segments when compared to the medial and lateral peripheral segments (e.g., the lens 18 has a width greater than a height). The same is true of the magnification regions 24—each includes a width greater than a height. Those skilled in the art will appreciate that the specific number and configuration of the magnification regions 24 is not limited to the arrangement depicted in the Figures. Indeed, optical lenses 18 are made in a variety of shapes and sizes to accommodate various aesthetic sensibilities, as well as to accommodate wearer's of different sizes. As the shape and size of the lens 18 changes, the configuration of the magnification regions 24 may also change. Furthermore, the difference in magnitude between the highest diopter rating and the lowest diopter rating may also change, which may also impact the number and configuration of magnification regions 24.

It is contemplated that the diopter rating from one boundary to the adjacent boundary may undergo a gradual transition between the two diopter ratings. For instance, with regard to the 2.5 diopter sub-region 24b, the lens 18 may not undergo a drastic step from 2.65 diopters to 2.5 diopters immediate outside of the 2.65 boundary. Rather, the transition from 2.65 diopters to 2.5 diopters may be gradual along an axis that is approximately perpendicular to the two boundaries. However, as can be seen in FIG. 2, the space between adjacent boundaries is not equal along all radially extending axes. Indeed, in the view depicted in FIG. 2, there is more space between boundaries at the upper segments of the boundaries and the lateral segments of the boundaries, and closer together between the medial segments and the bottom segments. Thus, a more gradual transition may occur where the boundaries are spaced further apart, and a more severe transition may occur where the boundaries are closer together.

Figure 3:
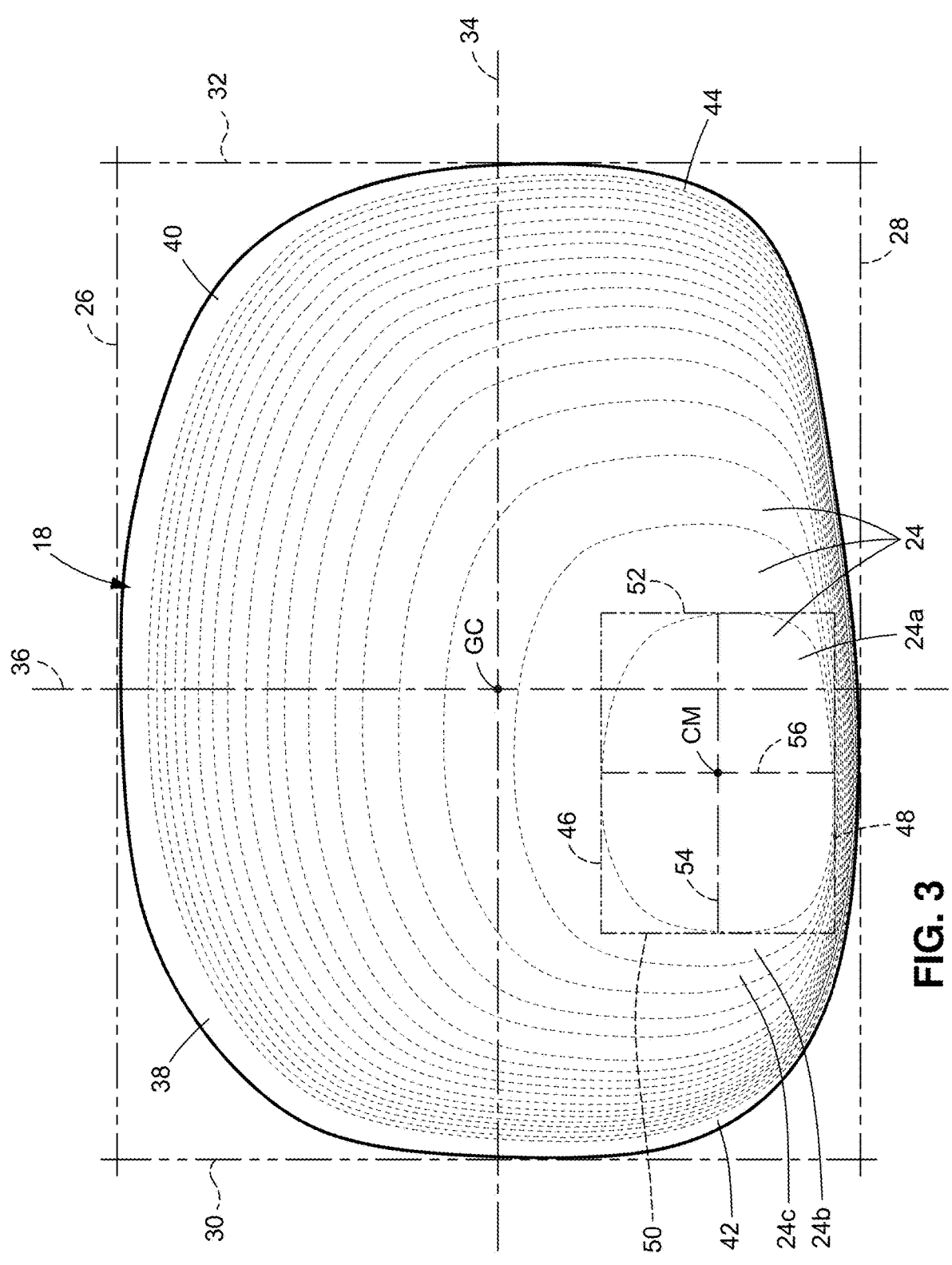
FIG. 3 is a reproduction of FIG. 2 without the diopter ratings.

Referring now specifically to FIG. 3, the lens 18 may define a geometric center GC, while the magnification regions 24 may define a center of magnification CM which is offset from the geometric center GC. With regard to the geometric center GC, each lens 18 may define an upper boundary axis 26 that is tangential to an uppermost edge segment of the lens 18, a lower boundary axis 28 that is tangential to a lowermost edge segment of the lens 18, a medial boundary axis 30 that is tangential to a medial-most edge segment of the lens 18, and a lateral boundary axis 32 that is tangential to a lateral-most edge segment of the lens 18. The upper boundary axis 26 and the lower boundary axis 28 may be parallel to each other, and the medial boundary axis 30 and lateral boundary axis 32 may be parallel to each other. Furthermore, the upper and lower boundary axes 26, 28 may be perpendicular to the medial and lateral boundary axes 30, 32. The lens 18 may further define a virtual longitudinal midline 34 extending halfway between upper boundary axis 26 and the lower boundary axis 28, as well as a virtual latitudinal midline 36 extending halfway between the medial boundary axis 30 and the lateral boundary axis 32. The longitudinal and latitudinal midlines 34, 36 may divide the lens 18 into quadrants 38, 40, 42, 44. Furthermore, the longitudinal midline 34 may delineate an upper region 38, 40 of the lens 18 from a lower region 42, 44 of the lens 18, and the latitudinal midline 36 may delineate a medial region 38, 42 of the lens 18 from a lateral region 40, 44 of the lens 18. In one embodiment, the geometric center GC may reside at the intersection of the longitudinal midline 34 and the latitudinal midline 36. However, in other embodiments, the geometric center GC may refer to a location that is within a certain proximity to the intersection of the longitudinal midline 34 and the latitudinal midline 36. For instance, the geometric center GC may be within a prescribed radius or oval-shaped region centered at the intersection. The prescribed radius may be defined by a distance no more than 5% of the magnitude of the length of the lens 18 along either the longitudinal midline 34 or the latitudinal midline 36. With regard to an oval-shaped region, the oval-shape may be defined by a major axis having a length equal to no more than 5% of the magnitude of the length of the lens 18 along the longitudinal midline 34, and a minor axis having a length equal to no more than 5% of the magnitude of the length of the lens 18 along the latitudinal midline 36.

The center of magnification CM may refer to a point or region about which all of the magnification regions 24 are positioned. In one embodiment, the center of magnification CM is defined by the centermost magnification region 24a in the same manner that the geometric center of the lens is defined. In more detail, the centermost magnification region 24a may define an upper boundary axis 46 that is tangential to an uppermost edge segment of the centermost magnification region 24a, a lower boundary axis 48 that is tangential to a lowermost edge segment of the centermost magnification region 24a, a medial boundary axis 50 that is tangential to a medial-most edge segment of the centermost magnification region 24a, and a lateral boundary axis 52 that is tangential to a lateral-most edge segment of the centermost magnification region 24a. The upper boundary axis 46 and the lower boundary axis 48 may be parallel to each other, and the medial boundary axis 50 and lateral boundary axis 52 may be parallel to each other. Furthermore, the upper and lower boundary axes 46, 48 may be perpendicular to the medial and lateral boundary axes 50, 52. The centermost magnification region 24a may further define a virtual longitudinal midline 54 extending halfway between upper boundary axis 46 and the lower boundary axis 48, as well as a virtual latitudinal midline 56 extending halfway between the medial boundary axis 50 and the lateral boundary axis 52. In one embodiment, the center of magnification CM may reside at the intersection of the longitudinal midline 54 and the latitudinal midline 56. The center of magnification CM may be surrounded by each magnification region.

The center of magnification CM may be positioned within a lower-medial quadrant or region 42 of the lens 18. This location may more effectively accommodate the biological deficiencies of the wearer's eye by aligning the highest magnification region in a region through which the user's line of sight most commonly passes, while providing decreased magnification in radially outward regions, which may minimize distortion to the viewer.

The arrangement of the magnification regions 24 on the lens 18 may result in all magnification regions 24 having at least some portion extending within the lower-medial quadrant 42, as well as the lower-lateral quadrant 44. However, one or more of the innermost regions 24 may have a greater portion located in the lower-medial quadrant 42 than the lower lateral quadrant 44. For instance, magnification regions 24a, 24b, and 24c each have a greater area within the lower-medial quadrant 42 than the lower lateral quadrant 44. Furthermore, the upper quadrants 38, 40 may not include some of the higher-level magnification regions.

The distance between the center of magnification CM on the left lens 18a and the right lens 18b when the lenses are installed on the eyewear 10 may be substantially equal to the average pupillary distance for an intended wearer. In this regard, the average pupillary distance in adults is between 54-74 mm, while the average in kids is between 43-58 mm. Thus, the distance between the centers of magnification CM may be approximately 50-80 mm for adult glasses, and in other embodiments between 54-74 mm, while the distance between the centers of magnification CM may be approximately 40-65 mm for children's glasses, and in other embodiments between 43-58 mm.

Figure 5:
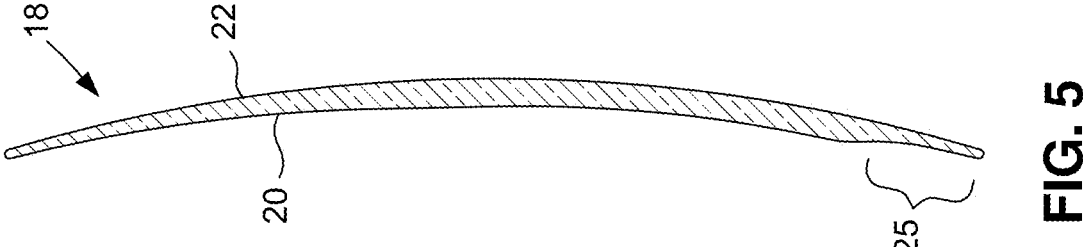
FIG. 5 is a cross sectional view of the lens shown in FIG. 2 taken along line 5-5.
Figure 4:
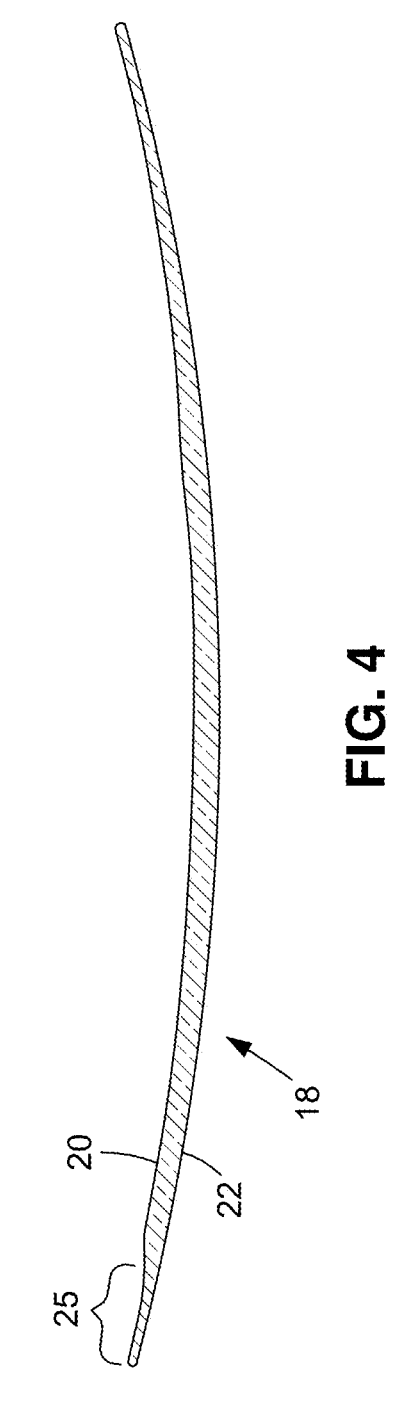
FIG. 4 is a cross sectional view of the lens shown in FIG. 2 taken along line 4-4.

The exemplary magnification gradient may produce a lens 18 having a varying thickness, which may be defined as a distance between the inner surface 20 of the lens 18 and the outer surface 22 of the lens 18. The lens thickness may be thickest in the region having a larger diopter rating, and thinner in regions having a smaller diopter rating. As such, the lens thickness may vary along the longitudinal midline 34 as well as varying along the latitudinal midline 36. FIGS. 4 and 5 depict exemplary cross sections showing varying thickness across the exemplary cross-sectional planes. The thickest area may be located in the lower-medial quadrant 42 and the thinner areas may be located around the periphery of the lenses 18. The lenses 18 may also include a peripherally-thinned area 25, which may be used to secure the lens 18 to the lens frame 12.

The lenses 18 may be formed via a molding process, wherein the mold may be quadrangular, and generally represented by the dotted box depicted in FIG. 2, with the lens 18 subsequently being trimmed to shape to fit the particular size of the lens rim 14.

Figures 6, 7:
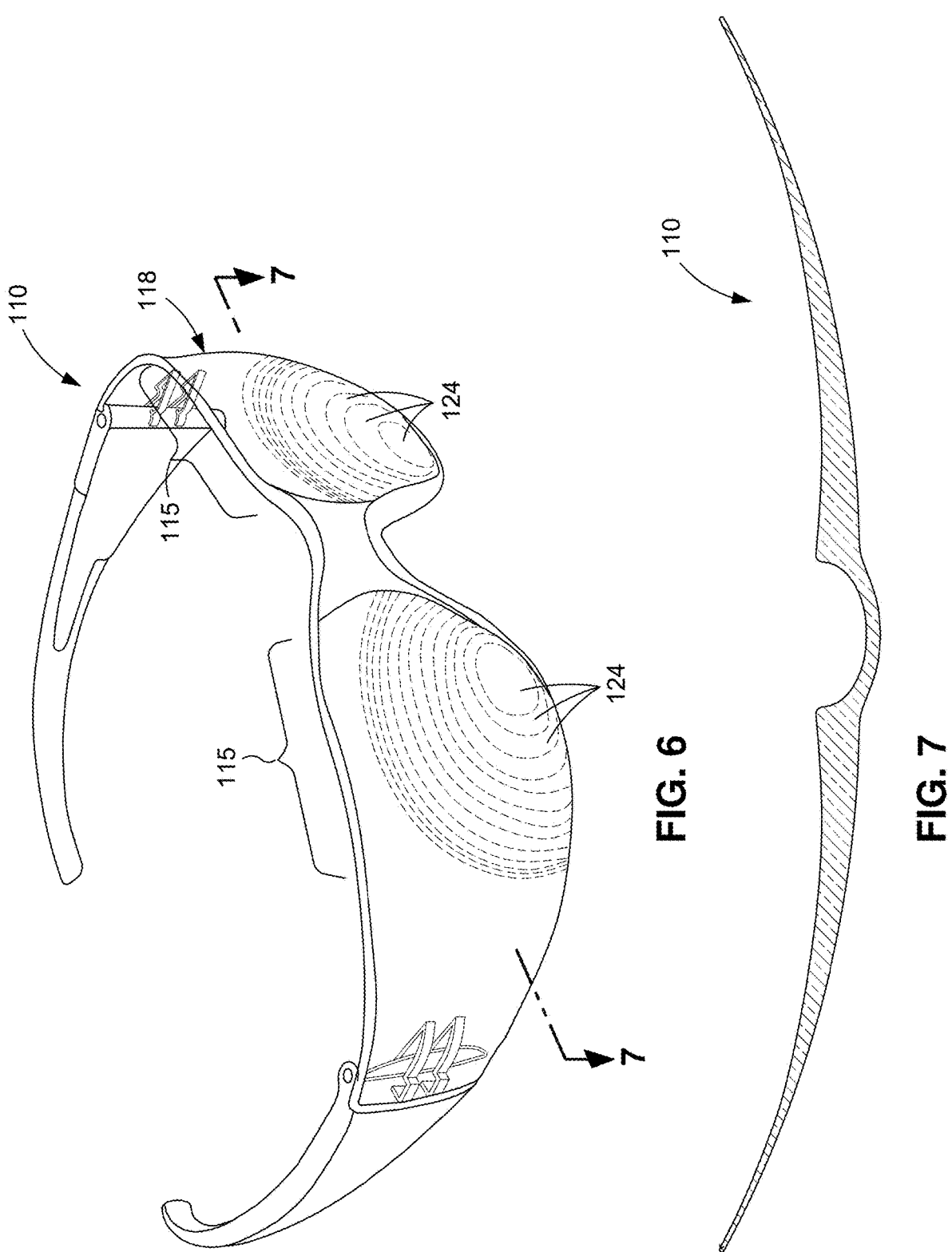
FIG. 6 is an upper perspective view of eyewear having a single, unitary lens having a pair of magnification zones, each of which includes a plurality of magnification regions.
FIG. 7 is a cross sectional view of the single, unitary lens of FIG. 6 taken along line 7-7.

Although the foregoing discusses eyewear 10 having a pair of lenses 18a, 18b, with each lens 18a, 18b including a unique and distinctive arrangement of the magnification gradient, and referring now specifically to FIGS. 6 and 7, it is contemplated that various aspects of the present disclosure may also apply to eyewear 110 comprising a single lens 118 that extends over both eyes. The single lens 118 includes a pair of optical regions 115 having magnification gradients therein. The optical regions 115 are integrally coupled to each other (e.g., not detachable from a lens frame), with each optical region 115 being optically alignable with a respective eye when the eyewear is worn by a user. Each optical region 115 includes a plurality of magnification regions 124, as described above. In one particular embodiment, the arrangement of the magnification regions 124 in one optical region 115 is a mirror image of the magnification regions 124 in the other optical region 115.

The single lens configuration may be particularly suitable for gaming, sports, or other activities. The magnification gradients in the optical regions 115 may allow the wearer to experience reduced levels of eye fatigue when wearing the eyewear 110 for extended periods of time, particularly when compared to conventional eyewear.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An optical lens for use with an eyewear frame, the optical lens comprising:
   an inner surface and an outer surface, the lens being configured to be positionable adjacent a wearer's eye to enable viewing through both the inner and outer surfaces of the lens; and
   a plurality of dioptric regions, each dioptric region extending between the inner surface and the outer surface and being associated with a respective dioptric magnitude and a respective peripheral boundary having a peripheral magnitude, a difference in dioptric magnitude between adjacent peripheral boundaries being the same for all adjacent peripheral boundaries, the peripheral boundaries for each of the plurality of dioptric regions being disposed about a common center and being complementary in shape to each other and configured such the peripheral magnitude of each magnification region increases in a radially outward direction, each peripheral boundary being rotationally non-symmetric in configuration, the plurality of dioptric regions being arranged such that an axis extending from the common center towards a periphery of the lens passes through a respective periphery of each dioptric region located between the common center and the periphery of the lens along the axis, adjacent peripheries being separated by a region width along the axis, each sequential region width along the axis becoming smaller from the common center toward the periphery of the lens;
   the lens defining a geometric center residing on at least one of a longitudinal midline of the lens or a latitudinal midline of the lens;
   the common center being offset from the geometric center along two axes;
   the plurality of dioptric regions collectively occupying the majority of the lens;
   wherein the peripheral boundaries of each of the dioptric regions define enclosed loops, and each region width along the axis progressively decreases from the common center toward the periphery of the lens.

2. The optical lens recited in claim 1, wherein the longitudinal midline delineates an upper region of the lens from a lower region of the lens, the common center being positioned within the lower region of the lens.

3. The optical lens recited in claim 2, wherein the latitudinal midline delineates a lateral region of the lens from a medial region of the lens, the common center being positioned within the medial region of the lens.

4. The optical lens recited in claim 2, wherein the inner surface and the outer surface define lens thickness therebetween, the lens thickness varying along the longitudinal midline.

5. The optical lens recited in claim 1, wherein the latitudinal midline delineates a lateral region of the lens from a medial region of the lens, the common center being positioned within the medial region of the lens.

6. The optical lens recited in claim 5, wherein the inner surface and the outer surface define a lens thickness therebetween, the lens thickness varying along the latitudinal midline.

7. The optical lens recited in claim 1, wherein a strength of one of the plurality of dioptric regions is 0.0 diopters and a strength of a second one of the plurality of dioptric regions is 2.65 diopters.

8. The optical lens recited in claim 1, wherein a difference in magnitude of strength of adjacent dioptric regions is 0.15 diopters.

9. The optical lens recited in claim 1, wherein the boundaries associated with at least two of the plurality of dioptric regions define an enclosed loop.

10. Eyewear for use on a wearer and positionable adjacent eyes of the wearer, the eyewear comprising:

an eyewear frame having a pair of lens rims defining a pair of lens openings; and a pair of optical lenses being attachable to respective ones of the pair of lens rims to reside within respective ones of the pair of lens openings, each optical lens comprising:

an inner surface and an outer surface, the lens being configured to be positionable adjacent a wearer's eye to enable viewing through both the inner and outer surfaces of the lens; and a plurality of dioptric regions, each dioptric region extending between the inner surface and the outer surface and being associated with a respective dioptric magnitude and a respective peripheral boundary having a peripheral magnitude, a difference in dioptric magnitude between adjacent peripheral boundaries being the same for all adjacent peripheral boundaries, the peripheral boundaries for the plurality of dioptric regions being disposed about a common center and being complementary in shape to each other and configured such the peripheral magnitude of each magnification region increases in a radially outward direction, each peripheral boundary being rotationally non-symmetric in configuration, the plurality of dioptric regions being arranged such that an axis extending from the common center towards a periphery of the lens passes through a respective periphery of each dioptric region located between the common center and the periphery of the lens along the axis, adjacent peripheries being separated by a region width along the axis, each sequential region width along the axis becoming smaller from the common center toward the periphery of the lens;

the lens defining a geometric center residing on at least one of a longitudinal midline of the lens or a latitudinal midline of the lens;

the common center being offset from the geometric center along two axes;

the plurality of dioptric regions collectively occupying the majority of the lens;

wherein the peripheral boundaries of the dioptric regions define enclosed loops, and each region width along the axis progressively decreases from the common center toward the periphery of the lens.

11. The eyewear recited in claim 10, wherein the pair of optical lenses include a left-side lens and a right side lens, the right side lens being a mirror image of the left side lens about an axis centered between the pair of lens rims.

12. The eyewear recited in claim 10, wherein the longitudinal midline delineates an upper region of the lens from a lower region of the lens, the common center being positioned within the lower region of the lens.

13. The eyewear recited in claim 12, wherein the latitudinal midline delineates a lateral region of the lens from a medial region of the lens, the common center being positioned within the medial region of the lens.

14. The eyewear recited in claim 12, wherein the inner surface and the outer surface define lens thickness therebetween, the lens thickness varying along the longitudinal midline.

15. The eyewear recited in claim 10, wherein the latitudinal midline delineates a lateral region of the lens from a medial region of the lens, the common center being positioned within the medial region of the lens.

16. The eyewear recited in claim 15, wherein the inner surface and the outer surface define a lens thickness therebetween, the lens thickness varying along the latitudinal midline.

17. The eyewear recited in claim 10, wherein a strength of one of the plurality of dioptric regions is 0.0 diopters and a strength of a second one of the plurality of dioptric regions is 2.65 diopters.

18. The eyewear recited in claim 10, wherein a difference in strength of adjacent dioptric regions is 0.15 diopters.

19. The eyewear recited in claim 10, wherein the boundaries associated with at least two of the plurality of dioptric regions define an enclosed loop.

20. An optical lens comprising:

an inner surface and an outer surface, the lens being configured to be positionable adjacent a wearer's eye to enable viewing through both the inner and outer surfaces of the lens; and a plurality of dioptric regions, each dioptric region extending between the inner surface and the outer surface and being associated with a respective minimum strength and a respective peripheral boundary, a difference in minimum strength between adjacent peripheral boundaries being the same for all adjacent peripheral boundaries, the peripheral boundaries for the plurality of dioptric regions being disposed about a common center, each peripheral boundary being rotationally non-symmetric in configuration, the plurality of dioptric regions being arranged such that an axis extending from the common center towards a periphery of the lens passes through a respective periphery of each dioptric region located between the common center and the periphery of the lens along the axis, adjacent peripheries being separated by a region width along the axis, each sequential region width along the axis becoming smaller from the common center toward the periphery of the lens;

the lens defining a geometric center residing on at least one of a longitudinal midline of the lens or a latitudinal midline of the lens;

the common center being offset from the geometric center along two axes;

the plurality of dioptric regions collectively occupying the majority of the lens;

wherein the peripheral boundaries of the dioptric regions define enclosed loops, and each region width along the axis progressively decreases from the common center toward the periphery of the lens.

\* \* \* \* \*